(12) United States Patent
Ceglia et al.

(10) Patent No.: US 8,769,345 B2
(45) Date of Patent: Jul. 1, 2014

(54) COMPUTING DEVICE AND METHODS OF PRESENTING DATA TO IDENTIFY FAULTS WITHIN POWER SYSTEMS

(75) Inventors: Kenneth Paul Ceglia, Gardnerville, NV (US); Robert Lloyd Spriggs, Gardnerville, NV (US); Scott Terrell Williams, Minden, NV (US); David Michael Robertson, Genoa, NV (US)

(73) Assignee: General Electric Company, Schenectady, NY (US)

( * ) Notice: Subject to any disclaimer, the term of this patent is extended or adjusted under 35 U.S.C. 154(b) by 367 days.

(21) Appl. No.: 13/194,157

(22) Filed: Jul. 29, 2011

(65) Prior Publication Data

US 2013/0031421 A1 Jan. 31, 2013

(51) Int. Cl.
*G06F 11/00* (2006.01)
(52) U.S. Cl.
USPC ........................................................ 714/46
(58) Field of Classification Search
USPC .............. 714/25–27, 33, 37, 38.1, 39, 45, 46, 714/47.1, 47.2, 47.3, 48, 57
See application file for complete search history.

(56) References Cited

U.S. PATENT DOCUMENTS

| | | | |
|---|---|---|---|
| 6,421,571 B1 | 7/2002 | Spriggs et al. | |
| 7,113,838 B2 * | 9/2006 | Funk et al. | 700/108 |
| 7,477,960 B2 * | 1/2009 | Willis et al. | 700/121 |
| 7,765,020 B2 * | 7/2010 | Lin et al. | 700/108 |
| 7,831,326 B2 * | 11/2010 | Lin et al. | 700/108 |
| 2003/0167238 A1 * | 9/2003 | Zeif | 705/400 |
| 2005/0177269 A1 * | 8/2005 | Funk | 700/121 |
| 2008/0082302 A1 | 4/2008 | Samardzija et al. | |
| 2008/0091390 A1 | 4/2008 | Samardzija et al. | |
| 2009/0077055 A1 | 3/2009 | Dillon et al. | |
| 2009/0149981 A1 | 6/2009 | Evans et al. | |

* cited by examiner

*Primary Examiner* — Nadeem Iqbal
(74) *Attorney, Agent, or Firm* — Fletcher Yoder, P.C.

(57) ABSTRACT

A computing device for use with a power system is provided. The computing device includes a processor that is programmed to organize data representative of at least one fault within the power system and to generate a graphical representation of the organized data. The computing device also includes a presentation interface that is coupled to the processor for presenting the graphical representation to a user to enable the user to identify the fault. Moreover, a user interface is coupled to the presentation interface and configured to enable the user to select at least one data point on the graphical representation such that the user is enabled to identify at least one variable of the fault.

20 Claims, 4 Drawing Sheets

COMPUTING DEVICE AND METHODS OF PRESENTING DATA TO IDENTIFY FAULTS WITHIN POWER SYSTEMS

BACKGROUND OF THE INVENTION

The field of the invention relates generally to power systems and, more particularly, to a computing device for use with a power system to present data to a user such that the user may identify faults and/or variables related to faults within a power system.

At least some known power systems include machines, such as turbines. Machines, such as turbines, may include components, such as bearings, gears, and/or shafts. Such components may wear over time resulting in faults, such as cracking and/or a misalignment of the component. Continued operation with a worn component with a fault may cause additional damage to other components and/or may lead to a premature failure of the component and/or associated system.

To detect component damage within machines, at least some known machines are continuously monitored with a monitoring system. At least some known monitoring systems use sensors to detect proximity measurements of at least some components of the system. Proximity measurements can be performed using eddy current sensors, magnetic pickup sensors, microwave sensors, and/or capacitive sensors. Data detected by such sensors is transmitted to a display device and/or computing device for analysis, and an output of the analysis is used to enable a user to identify any faults within the power system. Such data may include measurements and/or various variables that are summed and/or collated to determine if there is a fault within the power system.

However, in known monitoring systems, generally only the final diagnosis of the system is presented to the user. For example, the user may only be presented with a notification that a fault exists within the machine. As a result, the user may be unable to see the actual measurements and/or variables that facilitate the diagnosis of the fault. For example, the user may not be presented with the data in a graphical format that enables the user to identify the actual measurements and/or variables detected. Known computing and/or display devices are also not able to provide the user with an interactive platform that enables the user to select various measurements and/or variables for further consideration.

BRIEF DESCRIPTION OF THE INVENTION

In one embodiment, a computing device for use with a power system is provided. The computing device includes a processor that is programmed to organize data representative of at least one fault within the power system and to generate a graphical representation of the organized data. The computing device also includes a presentation interface that is coupled to the processor for presenting the graphical representation to a user to enable the user to identify the fault. Moreover, a user interface is coupled to the presentation interface and configured to enable the user to select at least one data point on the graphical representation such that the user is enabled to identify at least one variable of the fault.

In another embodiment, a power system is provided. The power system includes at least one machine that includes at least one component and at least one sensor that is positioned proximate to the component. The sensor is configured to detect at least one fault within the component. The power system also includes a computing device that is coupled to the sensor. The computing device includes a processor that is programmed to organize data representative of the fault and to generate a graphical representation of the data. Moreover, the computing device includes a presentation interface coupled to the processor for presenting the graphical representation to a user to enable the user to identify the fault. A user interface is coupled to the presentation interface and configured to enable the user to select at least one data point on the graphical representation such that the user is enabled to identify at least one variable of the fault.

In yet another embodiment, a method of presenting data to identify faults within a power system is provided. Data representative of at least one fault within the power system is organized via a processor. A graphical representation of the data is generated by the processor. The graphical representation is presented to a user via a presentation interface to enable the user to identify the fault. Moreover, the user is enabled to select at least one data point on the graphical representation, via a user interface, such that the user is enabled to identify at least one variable of the fault.

DETAILED DESCRIPTION OF THE INVENTION

The exemplary systems and methods described herein overcome at least some known disadvantages of known monitoring systems by presenting data detected within a power system in a graphical format to a user such that the user may identify the actual measurements and/or variables that may be representative of a fault within the power system. More specifically, the embodiments described herein provide a computing device for use with a power system. The computing device includes a processor that organizes data representative of at least one fault within the power system and that generates a graphical representation of the organized data. The computing device also includes a presentation interface that presents the graphical representation to a user to enable the user to identify the fault. Moreover, a user interface is coupled to the presentation interface to enable the user to variably select at least one data point on the graphical representation for use in identifying at least one variable of the fault. By using the system described herein, the user is able to identify a fault and to see the actual measurements and/or variables that enable a fault to be diagnosed. The user is also provided with an interactive platform that enables the user to select various measurements and/or variables that are specific to the fault.

Figure 1:
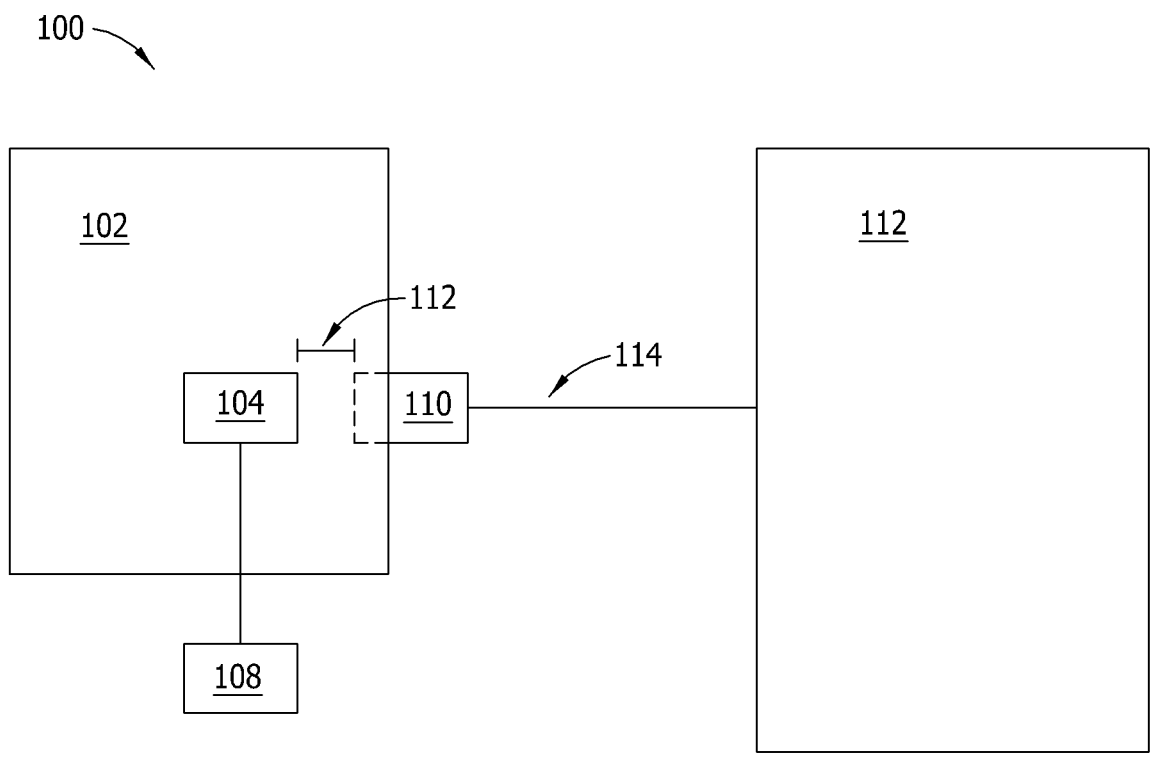
FIG. 1 is a block diagram of an exemplary power system.

FIG. 1 illustrates an exemplary power system 100 that includes at least one machine 102. In the exemplary embodiment, machine 102 is a variable speed machine, such as a wind turbine, a hydroelectric turbine, a gas turbine, and/or any other machine that operates with a variable speed. Alternatively, machine 102 may be a synchronous speed machine. Machine 102 includes at least one machine component 104, such as a gear and/or drive shaft. In the exemplary embodiment, component 104 is coupled to a load 108, such as a generator. It should be noted that, as used herein, the term "couple" is not limited to a direct communication, mechanical, and/or an electrical connection between components, but may also include an indirect communication, mechanical, and/or electrical connection between multiple components.

In the exemplary embodiment, component 104 is at least partially supported by one or more bearings (not shown) housed within machine 102 and/or within load 108. Alternatively or additionally, the bearings may be housed within a separate support structure (not shown), such as a gearbox, or any other structure that enables power system 100 to function as described herein.

Power system 100 also includes at least one sensor 110 that is positioned in close proximity to component 104. In the exemplary embodiment, sensor 110 measures various parameters related to component 104, such as a distance between component 104 and sensor 110. Sensor 110 may also monitor a crack within component 104 and/or a misalignment of component 104. For example, sensor 110 may use one or more microwave signals to measure a proximity, a frequency, a static and/or a vibration, of component 104 with respect to sensor 110. As used herein, the term "microwave" refers to a signal or a component that receives and/or transmits signals having frequencies between about 300 Megahertz (MHz) and to about 300 Gigahertz (GHz). Alternatively, sensor 110 may be any other sensor or transducer that is able to detect faults within system 100 and that enables system 100 to function as described herein.

A computing device 112 is coupled to sensor 110 via a data conduit 114. Alternatively, computing device 112 may be wirelessly coupled to sensor 110. In the exemplary embodiment, data conduit 114 is fabricated from a metallic wire. In the exemplary embodiment, conduit 114 is an electrical conductor that enables the connection between computing device 112 and sensor 110. Alternatively, other connections may be available between computing device 112 and sensor 110, including a low-level serial data connection, such as Recommended Standard (RS) 232 or RS-485, a high-level serial data connection, such as Universal Serial Bus (USB) or Institute of Electrical and Electronics Engineers (IEEE®) 1394, a parallel data connection, such as IEEE® 1284 or IEEE® 488, a short-range wireless communication channel such as BLUETOOTH®, and/or a private (e.g., inaccessible outside power generation system 100) network connection, whether wired or wireless. IEEE is a registered trademark of the Institute of Electrical and Electronics Engineers, Inc., of New York, N.Y. BLUETOOTH is a registered trademark of Bluetooth SIG, Inc. of Kirkland, Wash.

In the exemplary embodiment, computing device 112 processes and/or analyzes data received from sensor 110, and presents the data to a user, such as an operator of system 100. Alternatively, power system 100 may include multiple separate computing devices that are coupled to together, wherein at least one computing device processes and/or analyzes the data, and at least one other computing device presents the data to the user. In the exemplary embodiment, computing device 112 also presents historical and/or real-time data to the user.

During operation, in the exemplary embodiment, because of wear, damage, or vibration, for example, one or more components of power system 100, such as component 104, may change relative positions with respect to sensor 110. For example, vibrations may be induced to component 104 and/or component 104 may expand or contract as the operating temperature within power system 100 changes. In the exemplary embodiment, sensor 110 measures and/or monitors the proximity, such as the relative position of component 104 with respect to sensor 110, the frequency, static and/or vibrations of component 104 in order to enable at least one fault, such as a crack within component 104 and/or a misalignment of component 104, to be detected.

Sensor 110 transmits data representative of at least one fault within component 104 to computing device 112 for processing and/or analysis and for presentation of the data to a user. In the exemplary embodiment, computing device 112 provides a graphical and/or textual representation of such data. For example, computing device 112 provides a graphical representative of the data that enables the user to select at least one data point or value that facilitates the identification of at least one variable of the fault. For example, when a data point is selected, computing device 112 presents a textual representation of at least one variable corresponding to the data point, wherein the variable is representative of the fault. Alternatively, computing device 112 may present a different graphical representation of the specific data point that the user selects. In the exemplary embodiment, the variable corresponding to the data point is a measurement of the fault, such as a proximity measurement, a frequency measurement, and/or a vibration measurement.

Computing device 112 displays a final diagnosis of a fault and presents the user with the actual data and/or variables used in the diagnosis. As such, the user is able to see the actual measurements and/or variables that resulted in the diagnosis of the presence of the fault. Moreover, because computing device 112 also provides the user with an interactive platform, the user may select various measurements and/or variables specific to the fault.

Figure 2:
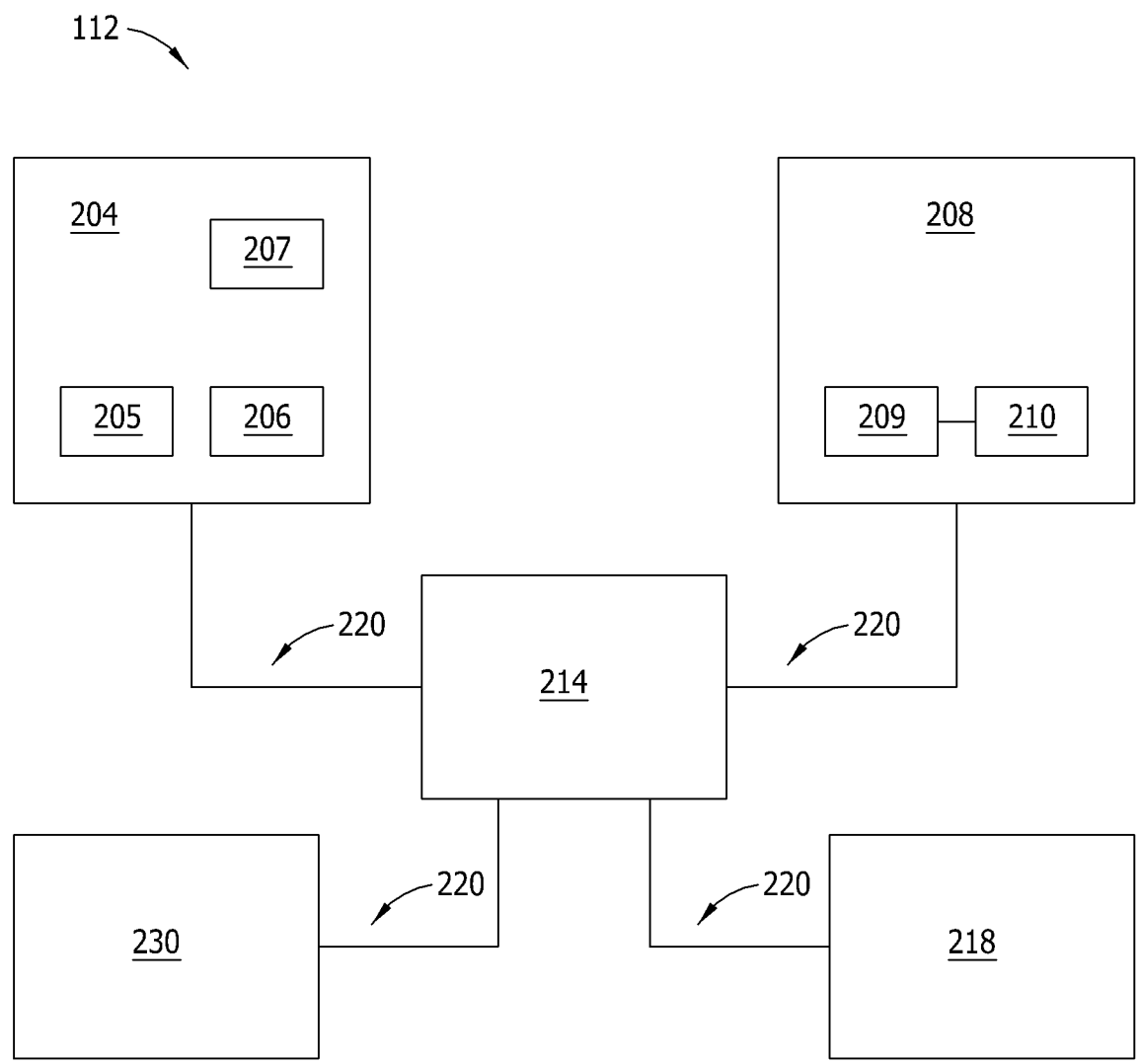
FIG. 2 is a block diagram of an exemplary computing device that may be used with the power system shown in FIG. 1.

FIG. 2 is an exemplary block diagram of computing device 112. In the exemplary embodiment, computing device 112 includes a user interface 204 that receives at least one input from a user. In the exemplary embodiment, user interface 204 includes a keyboard 205 that enables the user to input pertinent information. In the exemplary embodiment, user interface 204 also includes a pointing device 206 and a mouse 207. Alternatively, user interface 204 may include, for example, a stylus, a touch sensitive panel (e.g., a touch pad or a touch screen), a gyroscope, an accelerometer, a position detector, and/or an audio input interface (e.g., including a microphone).

In the exemplary embodiment, computing device 112 includes a presentation interface 208 that displays/presents information, such as input events and/or validation results, to the user. In the exemplary embodiment, presentation interface 208 includes a display adapter 209 that is coupled to at least one display device 210. More specifically, in the exemplary embodiment, display device 210 is a visual display device, such as a cathode ray tube (CRT), a liquid crystal display (LCD), an organic LED (OLED) display, and/or an "electronic ink" display. Alternatively, presentation interface 208 may include an audio output device (e.g., an audio adapter and/or a speaker) and/or a printer.

Computing device 112 also includes a processor 214 and a memory device 218. In the exemplary embodiment, processor 214 is coupled to user interface 204, presentation interface 208, and to memory device 218 via a system bus 220. In the exemplary embodiment, processor 214 communicates with the user, such as by prompting the user via presentation interface 208 and/or by receiving user inputs via user interface 204. In the exemplary embodiment, processor 214 is also programmed by encoding an operation using one or more executable instructions and providing the executable instructions in memory device 218. For example, processor 214 is programmed to organize data representative of at least one fault within power system 100 (shown in FIG. 1) that processor 214 receives from sensor 110 (shown in FIG. 1). More specifically, processor 214 is programmed to generate a hierarchy of the data, wherein the highest data point or value is organized as a first tier within the hierarchy and the lowest data point or value is organized as a last tier within the hierarchy. Processor 214 is also programmed to generate a graphical representation of the data. Processor 214, in the exemplary embodiment, is also programmed to calculate at least one variable based on data. For example, after a user selects a data point or value on the graphical representation, processor 214 calculates the variable associated with the data point selected.

The term "processor" refers generally to any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor."

In the exemplary embodiment, memory device 218 includes one or more devices that enable information, such as executable instructions and/or other data, to be stored and retrieved. Moreover, in the exemplary embodiment, memory device 218 includes one or more computer readable media, such as, without limitation, dynamic random access memory (DRAM), static random access memory (SRAM), a solid state disk, and/or a hard disk. In the exemplary embodiment, memory device 218 stores, without limitation, application source code, application object code, configuration data, additional input events, application states, assertion statements, validation results, and/or any other type of data. More specifically, in the exemplary embodiment, memory device 218 stores input data received by a user via user interface 204, and/or information received from other components of power system 100.

Computing device 112, in the exemplary embodiment, also includes a communication interface 230 that is coupled to processor 214 via system bus 220. Moreover, in the exemplary embodiment, communication interface 230 is coupled to sensor 110 via data conduit 114 (shown in FIG. 1) and is configured to receive data from sensor 110.

During operation, in the exemplary embodiment, because of wear, damage, or vibration, for example, one or more components of power system 100, such as component 104 (shown in FIG. 1), may change positions with respect to sensor 110. For example, vibrations may be induced to component 104 and/or component 104 may expand or contract as the operating temperature within power system 100 changes. In the exemplary embodiment, sensor 110 measures and/or monitors the proximity, such as the relative position of component 104 with respect to sensor 110, the frequency, static and/or vibration in order to enable at least one fault, such as a crack within component 104 and/or misalignment of component 104, to be detected.

Sensor 110 transmits data representative of at least one fault within component 104 to computing device 112 for processing and/or analysis and for presentation to a user. More specifically, in the exemplary embodiment, communication interface 230 receives the data and transmits the data to processor 214. Processor 214 organizes the data by generating a hierarchy of the data, wherein the highest data point or value is organized as a first tier within the hierarchy and the lowest data point or value is organized as a last tier within the hierarchy. Moreover, processor 214 generates a graphical representation of the data. The graphical representation is presented to a user via display device 210 within presentation interface 208.

When a user is looking at the display of the graphical representation, the user may select a portion of the graphical representation to identify at least one variable of the fault that is detected. For example, the user may click on at least one data point or value on the graphical representation via the user interface 204. More specifically, the user may use pointing device 206 or mouse 207 to select the data point or value. After the data point or value is selected, processor 214 calculates at least one variable that is representative of the data point or value selected. A textual and/or graphical representation of the variable is presented to the user via presentation interface 208. In the exemplary embodiment, the variable is a frequency measurement and/or a vibration measurement of the fault.

Figure 3:
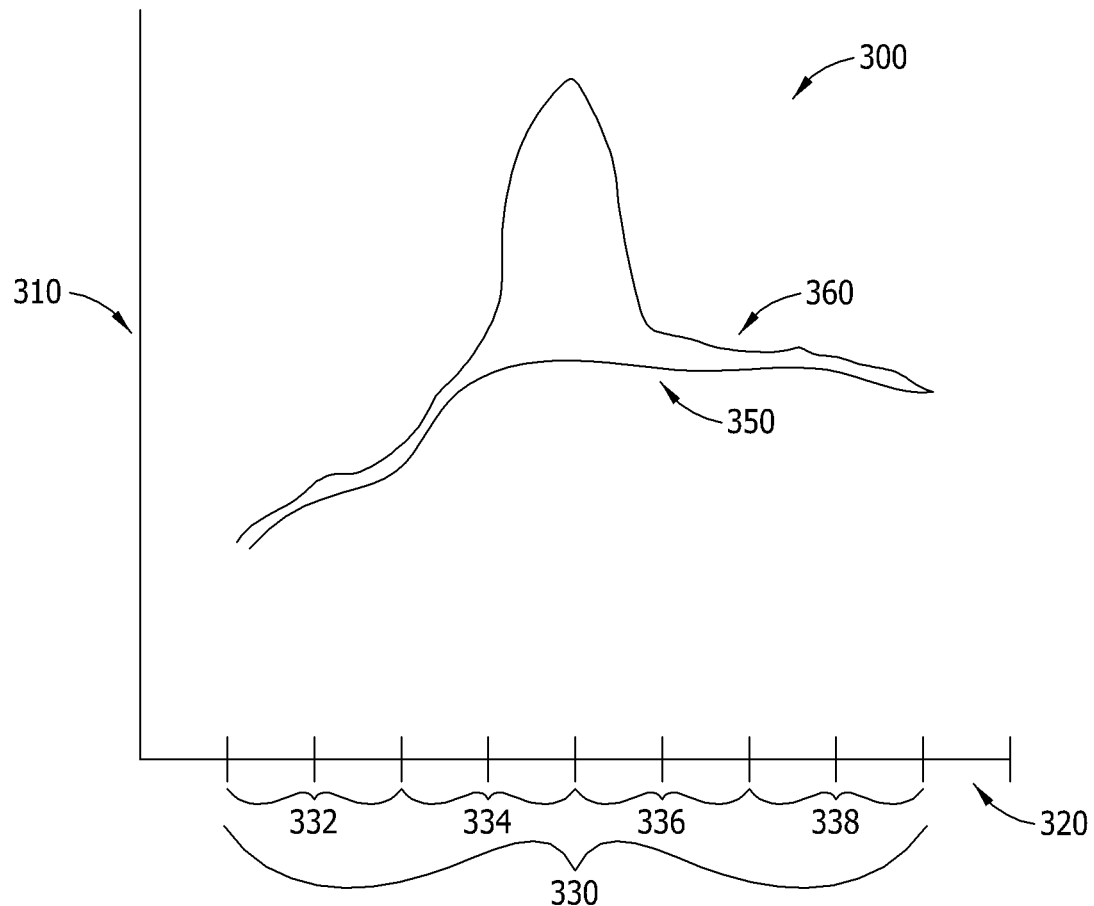
FIG. 3 is a graphical view of an exemplary output that may be generated by the computing device shown in FIG. 2.

FIG. 3 is a graphical view of an exemplary output 300 that may be generated by computing device 112 (shown in FIGS. 1 and 2). More specifically, in the exemplary embodiment, output 300 is a graphical comparison of a vibration measurement 310 (shown on the ordinate axis of FIG. 3) contained within the microwave signal at a specific frequency 320 in GHz (shown on the abscissa axis of FIG. 3). In the exemplary embodiment, sensor 110 (shown in FIG. 1) generates microwave signals that each includes a plurality of frequency components within predefined frequency bands 330 having a frequency range between approximately 1 GHz and approximately 20 GHz. In the exemplary embodiment, such frequency bands 330 include a first frequency band 332, a second frequency band 334, a third frequency band 336, and a fourth frequency band 338. More specifically, in the exemplary embodiment, second frequency band 334 is proportional to first frequency band 332 by a power of two. For example, first frequency band 332 includes frequencies between approximately 1 GHz and approximately 2 GHz, and second frequency band 334 includes frequencies between approximately 2 GHz to approximately 4 GHz. Moreover, third frequency band 336 includes frequencies between approximately 4 GHz to approximately 8 GHz. Further, fourth frequency band 338 includes frequencies between approximately 8 GHz and approximately 16 GHz. Alternatively, a user may generate any other type of graphical representation of output 300, such as a logarithmic and/or a linear scale representation, that is appropriate and/or suitable for the user's needs.

In the exemplary embodiment, output 300 compares an expected vibration level response curve 350 to an actual vibration level response curve 360. Expected vibration level response curve 350 is based on an expected vibration level of each frequency received from sensor 110 (shown in FIG. 2) for an undamaged component 104 (shown in FIG. 1). Actual vibration level response curve 360 is based on an actual vibration level for each frequency received from sensor 110. If the difference between each actual vibration level and each expected vibration level is approximately zero, then component 104 (shown in FIG. 1) is determined not to contain any faults, including cracks and/or a misalignment of component 104. Alternatively, if the difference between each actual vibration level and each expected vibration level is greater than zero, then component 104 is determined to include at least one fault.

In the exemplary embodiment, a user may select a portion of output 300 for use in identifying at least one variable of the fault. For example, the user may click on at least one data point or any value on output 300 via user interface 204 (shown in FIG. 2). More specifically, the user may use pointing device 206 (shown in FIG. 2) or mouse 207 (shown in FIG. 2) to select the data point(s) or value(s). Processor 214 (shown in FIG. 2) then calculates at least one variable that is representative of the data point or value selected. A textual and/or graphical representation of the variable is presented to the user via presentation interface 208. For example, the textual and/or graphical representation of the variable may be presented to the user below output 300 such that the user may be able to see output 300 and the selected variable at the same time.

Figure 4:
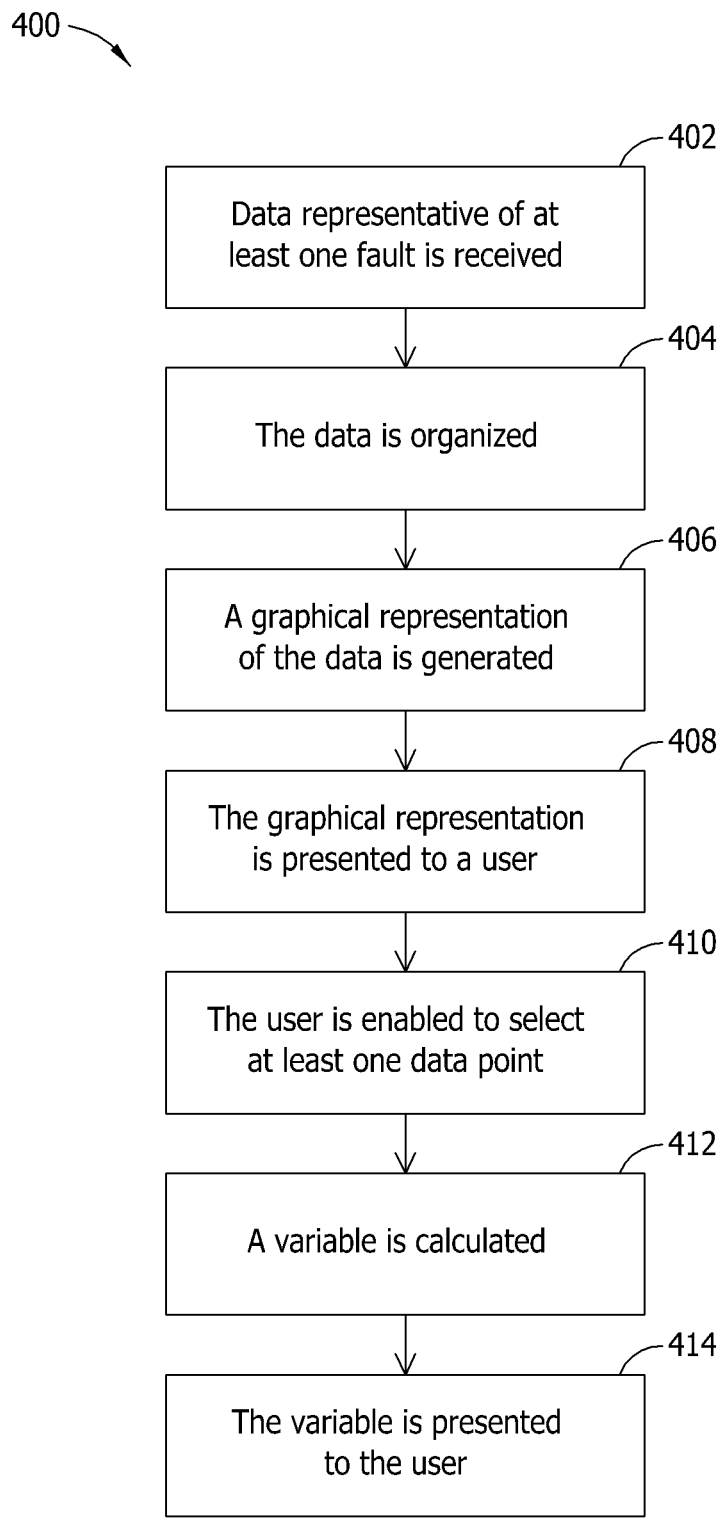
FIG. 4 is a flow diagram of an exemplary method of presenting data to identify faults using the computing device shown in FIG. 2.

FIG. 4 is a flow diagram of a method 400 that may be used to present data to identify faults using a computing device, such as computing device 112 (shown in FIGS. 1 and 2.). Data representative of at least one fault within a component 104 (shown in FIG. 1) of a power system 100 (shown in FIG. 1) is received 402 via a communication interface 230 (shown in FIG. 1). The data is organized 404 via a processor 214 (shown in FIG. 2). A graphical representation of the data is generated 406 via processor 214 to enable the fault to be identified. The graphical representation of the data is presented 408 to a user via presentation interface 208 (shown in FIG. 2).

The user is enabled 410, via a user interface 204 (shown in FIG. 2), to select at least one data point on the graphical representation for identifying at least one variable of the fault. More specifically, in the exemplary embodiment, processor calculates 412 the variable after the data point on the graphical representation is selected. The variable is presented 414 to the user in a textual representation and/or a graphical representation via presentation interface 208.

As compared to known systems and methods that are used to present data of a power system, the exemplary systems and methods described herein present data detected within a power system in a graphical format to a user such that the user may identify the actual measurements and/or variables that may be representative of a fault within the power system. More specifically, the embodiments described herein provide a computing device for use with a power system. The computing device includes a processor that organizes data representative of at least one fault within the power system and that generates a graphical representation of the organized data. The computing device also includes a presentation interface that presents the graphical representation to a user to enable the user to identify the fault. Moreover, a user interface is coupled to the presentation interface to enable the user to variably select at least one data point on the graphical representation for use in identifying at least one variable of the fault. By using the system described herein, the user is able to identify a fault and to see the actual measurements and/or variables that enable a fault to be diagnosed. The user is also provided with an interactive platform that enables the user to select various measurements and/or variables that are specific to the fault.

A technical effect of the systems and methods described herein includes at least one of: (a) organizing, via a processor, data representative of at least one fault within a power system; (b) generating, via a processor, a graphical representation of data; (c) presenting a graphical representation to a user via a presentation interface to enable the user to identify at least one fault; and (d) enabling a user to select at least one data point on a graphical representation, via a user interface, such that the user is enabled to identify at least one variable of at least one fault.

Exemplary embodiments of systems and methods are described above in detail. The systems and methods are not limited to the specific embodiments described herein, but rather, components of the systems and/or steps of the methods may be utilized independently and separately from other components and/or steps described herein. For example, the system may also be used in combination with other systems and methods, and is not limited to practice with only the system as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computing device for use with a power system, said computing device comprising:
a processor programmed to:
organize data representative of at least one fault within the power system; and
generate a graphical representation of the organized data, the graphical representation comprising a comparison of an expected data curve with an actual data curve relating to the data;
a presentation interface coupled to said processor for presenting the graphical representation to a user to enable the user to identify the at least one fault; and
a user interface coupled to said presentation interface and configured to enable the user to select at least one data point on the graphical representation such that the user is enabled to identify at least one variable of the at least one fault.

2. A computing device in accordance with claim 1, wherein said processor is further programmed to calculate the at least one variable after the at least one data point on the graphical representation is selected.

3. A computing device in accordance with claim 2, wherein said processor calculates the at least one variable by calculating at least one vibration measurement at one or more specific frequency bands.

4. A computing device in accordance with claim 1, further comprising a communication interface coupled to said processor for receiving the data, wherein the data includes at least one of real time data and historical data.

5. A computing device in accordance with claim 4, wherein the one or more specific frequency bands comprise a first frequency band, a second frequency band, a third frequency band, and a fourth frequency band;
wherein the first frequency band comprises frequencies between approximately 1 GHz and 2 GHz;
wherein the second frequency band comprises frequencies between approximately 2 GHz and 4 GHz;
wherein the third frequency band comprises frequencies between approximately 4 GHz and 8 GHz; and
wherein the fourth frequency band comprises frequencies between approximately 8 GHz and 16 GHz.

6. A computing device in accordance with claim 1, wherein said processor organizes the data by generating a hierarchy of the data, the hierarchy comprising at least two-tiers wherein a highest data point is organized as a first tier and a lowest data point is organized as a last tier.

7. A computing device in accordance with claim 1, wherein said user interface further comprises at least one of a pointing device and a mouse that are each configured to enable the user to select the at least one data point on the graphical representation.

8. A power system comprising:
   at least one machine comprising at least one component;
   at least one sensor positioned proximate to said at least one component and configured to detect at least one fault within the at least one component; and
   a computing device coupled to said at least one sensor, said computing device comprising:
      a processor programmed to:
         organize data representative of the at least one fault by generating a hierarchy of the data, wherein a highest data point is organized as a first tier of the hierarchy and a lowest data point is organized as a last tier; and
         generate a graphical representation of the data;
      a presentation interface coupled to said processor for presenting the graphical representation to a user to enable the user to identify the at least one fault; and
      a user interface coupled to said presentation interface and configured to enable the user to select at least one data point on the graphical representation such that the user is enabled to identify at least one variable of the at least one fault.

9. A power system in accordance with claim 8, wherein said processor is programmed to calculate the at least one variable after the at least one data point on the graphical representation is selected.

10. A power system in accordance with claim 9, wherein said processor calculates the at least one variable by calculating at least one vibration measurement at one or more specific frequency bands.

11. A power system in accordance with claim 10, wherein the one or more specific frequency bands comprise a first frequency band, a second frequency band, a third frequency band, and a fourth frequency band.

12. A power system in accordance with claim 8, wherein said computing device further comprises a communication interface coupled to said processor for receiving the data, the data includes at least one of real time data and historical data.

13. A power system in accordance with claim 8, wherein the graphical representation comprises a comparison of an expected data curve with an actual data curve relating to the data.

14. A power system in accordance with claim 8, wherein said user interface further comprises at least one of a pointing device and a mouse that are each configured to enable the user to select the at least one data point on the graphical representation.

15. A method of presenting data to identify a fault within a power system, said method comprising:
   organizing, via a processor, data representative of at least one fault within the power system by generating a hierarchy of the data, wherein a highest data point is organized as a first tier of the hierarchy and a lowest data point is organized as a last tier;
   generating, via the processor, a graphical representation of the data, the graphical representation comprising a comparison of an expected data curve with an actual data curve relating to the data;
   presenting the graphical representation to a user via a presentation interface to enable the user to identify the at least one fault; and
   enabling the user to select at least one data point on the graphical representation, via a user interface, such that the user is enabled to identify at least one variable of the at least one fault.

16. A method in accordance with claim 15, further comprising calculating, via the processor, the at least one variable after the at least one data point on the graphical representation is selected.

17. A method in accordance with claim 15, further comprising presenting the at least one variable in at least one of a textual representation and a graphical representation, via the presentation interface.

18. A method in accordance with claim 15, further comprising receiving the data representative of the at least one fault via a communication interface.

19. A method in accordance with claim 15, wherein the data is representative of a crack within a component, with a misalignment of a component, or both.

20. A method in accordance with claim 15, wherein organizing, via a processor, data representative of at least one fault further comprises organizing data representative of the at least one fault that includes at least one of real time data and historical data.

* * * * *